Feb. 13, 1945.  J. N. GRABER  2,369,227
TRAVERSE ROD
Filed May 14, 1943  2 Sheets-Sheet 1
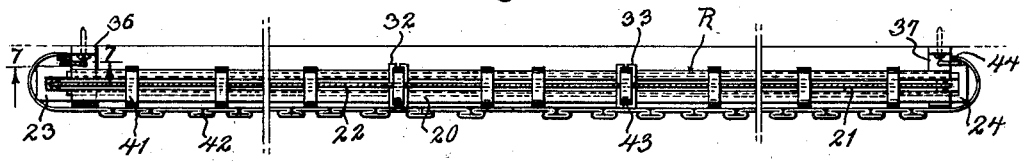
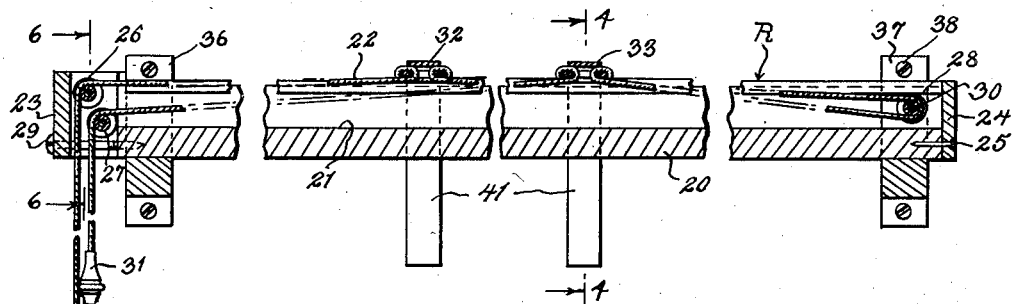
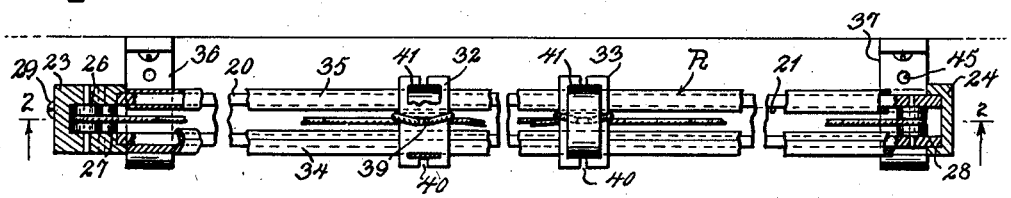
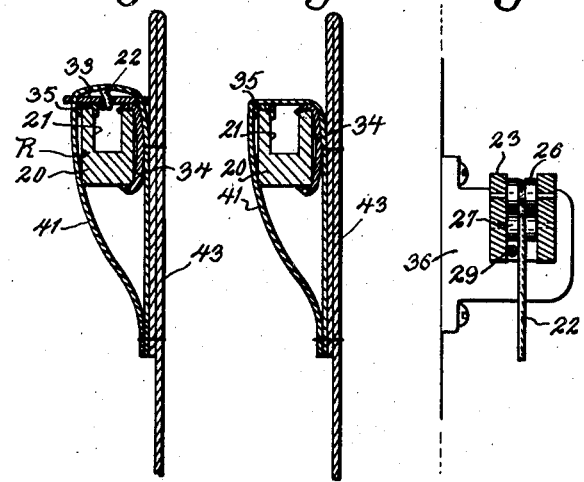
INVENTOR
JOHN N. GRABER
BY
ATTORNEYS Feb. 13, 1945.   J. N. GRABER   2,369,227
TRAVERSE ROD
Filed May 14, 1943   2 Sheets-Sheet 2
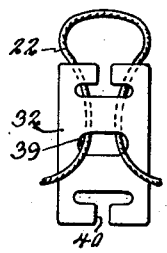
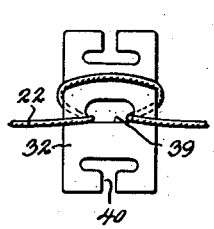
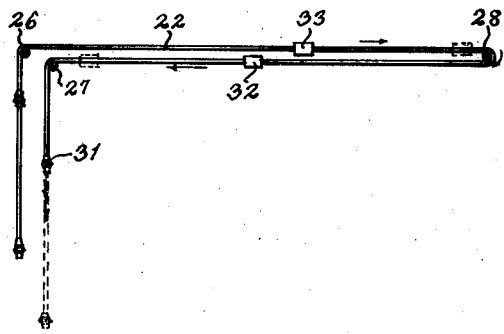
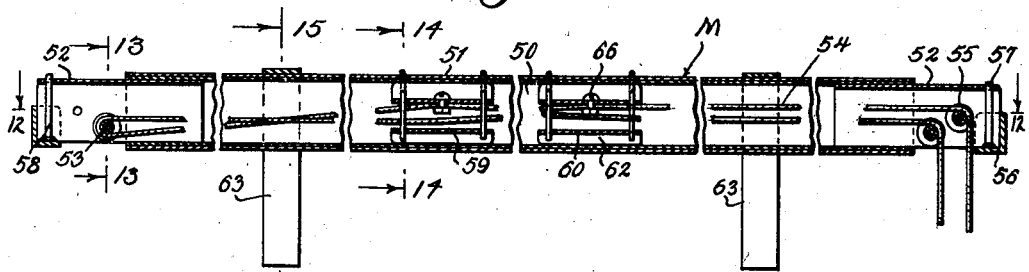
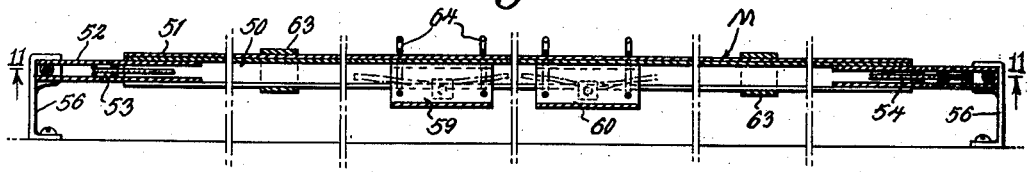
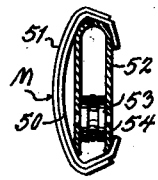
INVENTOR
JOHN N. GRABER
BY
ATTORNEYS Patented Feb. 13, 1945

2,369,227

UNITED STATES PATENT OFFICE 2,369,227

TRAVERSE ROD

John N. Graber, Madison, Wis.

Application May 14, 1943, Serial No. 486,934

6 Claims. (Cl. 160—345)

This invention appertains to drapery rods and more particularly to a novel transverse rod for supporting a pair of drapes or curtains for traveling movement across a window or similar opening.

One of the primary objects of my invention is to provide novel means for constructing the rod and for supporting the drapes from the rod whereby the drapes can be carried at a point slightly spaced from their upper ends so that the rod will be hidden from view by said drapes.

Another salient object of my invention is to provide novel means for forming the rod whereby the same can be effectively fabricated from wood and thereby eliminate the use of essential war material.

A further important object of my invention is to provide novel means for associating the pull slides for the drapes with the rear face of the rod, whereby not only will the slides be easy to operate, but whereby the slides and the pull cords will be hidden from view.

A further important object of my invention is the provision of novel means for connecting the drapes or curtains with the rod and with the pull slides whereby not only will a simple and durable construction be had, but whereby the rod itself will be completely hidden from view by the upper ends of said drapes or curtains.

A still further important object of my invention is the provision of means whereby the drapery rod can be economically formed from metal and whereby a strong, sturdy and compact structure will be had.

With these and other objects in view, the invention consists in the novel construction, arrangement, and formation of parts, as will be hereinafter more specifically described, claimed, and illustrated in the accompanying drawings, in which drawings:

Figure 1 is a top plan view of my improved rod showing a pair of drapes or curtains supported thereby.

Figure 2 is a vertical longitudinal sectional view through the rod taken on the line 2—2 of Figure 3 looking in the direction of the arrows.

Figure 3 is a view similar to Figure 1 but showing the rod and its appurtenances on an enlarged scale with parts thereof broken away and in section.

Figure 4 is a transverse sectional view through the rod taken on the line 4—4 of Figure 2 looking in the direction of the arrows and illustrating one novel means for connecting the drapes or curtains with the pull slide.

Figure 5 is a view similar to Figure 4 but showing one of the novel means for connecting a drape or curtain with the rod for traveling movement.

Figure 6 is a detail sectional view taken on the line 6—6 of Figure 2 looking in the direction of the arrows illustrating the means for connecting the rod cap or end, which carries the pulleys for the pull cords, with the rod.

Figure 7 is a detail sectional view taken on the line 7—7 of Figure 1 looking in the direction of the arrows illustrating the means for connecting the outer ends of the drapes or curtains with the supporting brackets around the ends of the rod.

Figures 8 and 9 are detail top plan views illustrating the means for connecting the pull slides with the pull cords.

Figure 10 is a detail diagrammatic view illustrating the arrangement of the pull cord.

Figure 11 is an enlarged vertical longitudinal sectional view through a modified form of my traverse rod, the section being taken substantially on the line 11—11 of Figure 12 looking in the direction of the arrows.

Figure 12 is a horizontal sectional view through the modified form of rod taken on the line 12—12 of Figure 11 looking in the direction of the arrows.

Figure 13 is a detail sectional view taken through the end of the rod on the line 13—13 of Figure 11.

Figure 14 is a detail transverse sectional view taken on the line 14—14 of Figure 11 illustrating one means for connecting drapes or curtains with one of the pull slides.

Figure 15 is a detail transverse sectional view taken on the line 15—15 of Figure 11 looking in the direction of the arrows showing one means for slidably connecting an intermediate part of the drape or curtain with the rod.

Referring to the drawings in detail, wherein similar reference characters designate corresponding parts throughout the several views the letter R generally indicates my novel drapery traverse rod and the same includes a solid main rod section or bar 20. This main rod section or bar 20 is formed from a length of wood stock and the upper edge thereof is provided with a longitudinally extending groove 21 for the reception of the pull cord 22. This rod 20 can be made in various lengths for different width windows or the rod can be cut at the time of installation to suit a particular window or door opening. After the rod section 20 has been cut to size, the ends thereof can be closed by detachable wood caps or terminal pieces 23 and 24. The cap 24 can be secured in place by fastening elements such as nails or brads 25. The cap 23 forms a support for the upper and lower pulleys 26 and 27 for the stretches of the pull cord 22. The pulley 28 for the intermediate portion of the pull cord can be carried by the rod section 20 adjacent the cap 24. The cap 23 is detachably held in place on the rod section 20 by means of a screw 29. The cap 24 can be associated with the rod section at the time of the installing of the rod and when the rod has been cut to suit. It is also preferred to make the pulleys 26, 27 and 28 from wood and these pulleys can be mounted on transversely extending pivots 30 which can be in the nature of nails.

Referring to the pull cord 22, it will be noted that the same is made from a single length and that the same is first trained about the pulley 28 and is laid in the groove 21 with one stretch trained over the pulley 26 and the other stretch trained over the pulley 27. The ends of the pull cord can be provided with pull knobs 31.

The rod itself is more or less formed from comparatively rough stock and in order to enhance the appearance of the rod and to form an anti-friction surface so as to prevent the catching of the drapes on the rough wood or the catching of the drape slides 32 and 33 in the rough wood, a front plastic facing strip 34 is utilized and a top rear plastic strip 35 is employed. These plastic strips 34 and 35 can be made in any desired colors and the front strip 34 (see Figures 4 and 5) is of a substantially C shape in cross section is merely snapped over the front face of the rod. The plastic strip 35 is of a substantially U shape in cross section and is snapped over the upper edge of the rod (see Figures 3, 4, and 5), to cover that portion of the top of the rod defined by the rail face of the rod and one inner wall of the groove 21. The strips extend from one end of the rod to the other and cover the rod completely from the end caps or terminals 23 and 24.

As stated above, one of the important functions of the plastic strips 34 and 35 is to provide a smooth, anti-friction surface for the drape slides 32 and 33 to ride on. These strips 34 and 35 give a smooth, finished surface to the rod, and the catching of the slides or the drapes themselves on the wood is prevented.

In using this wood type of rod, wooden brackets 36 and 37 are utilized and these brackets can be secured to opposite sides of the opening by the employance of suitable fastening elements 38. The rod is placed in these brackets inwardly of the end caps 23 and 24 and the end caps can engage the outer face of the brackets so as to prevent longitudinal shifting movement of the rod in said brackets. The brackets also function to effectively hold the front plastic strip 34 in place.

Referring more specifically to the slides 32 and 33 (see Figures 8 and 9), it will be noted that the same are formed from flat pieces of plastic and that each of the slides are provided with a central transversely extending opening 39 and T shaped end slots 40. These slides rest on the top of the bar or rod section 20 and against the upper surfaces of the plastic strips 34 and 35. One of the slides is fastened to one stretch of the pull cord 22 and the other slide is fastened to the other stretch of the pull cord. This is clearly shown in Figure 10 of the drawings. The slides are easily fastened to the stretches of the pull cord by simply looping these stretches and pulling the loops through the opening 39 and then placing the loops over the slides. The method of attaching the slides to the pull cords is clearly illustrated in Figures 8 and 9.

According to my invention, it is proposed to sew loops 41 to the sections 42 and 43 of the drapes or curtains at spaced points and the rod section 20 is trained through these loops at the time of the rod installation. These tapes or loops 41 are sewed to the inner faces of the drapes or curtain sections slightly below the upper edge of said drapes or curtains. Hence the drapes or curtains are supported by the rod section slightly below the upper ends of the drapes or curtains and thus the drapes or curtains extend in front of the bar or main rod section. This completely hides the front of the rod to view. The innermost loops 41 of the drape or curtain are attached to the slides 32 and 33 and this is easily accomplished by slipping the tapes in the open ends of the slots 40 so that the tapes will rest in the transverse portions of said slots 40. This provides a convenient and easy means for connecting the inner ends of the drape or curtain sections to the slides. As these slides and loops 41 rest on the plastic strips 34 and 35 an anti-friction surface is provided for the tapes and slides. By pulling on either end of the pull cord 22 the drape or curtain sections can be moved toward and away from one another. To completely hide the ends of the drapery rod, it is proposed to connect drapery hooks 44 with the outer-most loops 41 of the curtain or drape sections and the shanks of these hooks will then be inserted in openings 45 formed in the supporting brackets 36 and 37. This is best shown in Figures 1 and 7.

Some of the important features of my invention can be employed in a simple form of metallic rod and this form of my invention is illustrated in Figures 11 to 15 inclusive. The metal drapery rod is generally indicated by the letter M and includes a main rod section 50 formed from sheet metal having a substantially C shape in cross section. This rod section can be cut to suit the width of the opening and the front face thereof can be covered by a plastic strip 51, which is also of a C shape in cross section. This plastic strip 51 is simply snapped over the metal rod. After the rod has been cut to suit, the ends of the same have snugly fitted therein end pieces 52 which are of a U shape in cross section. These end pieces 52 can be readily stamped from sheet metal and bent into shape. One of the end pieces carries a guide pulley or roller 53 for the intermediate part of a pull cord 54 and the other end piece can carry pulleys 55. One stretch of the pull cord is trained about one pulley 55 and the other stretch is trained about the other pulley. Metal brackets 56 can be secured to the wall for receiving the ends of the rod and the ends of the rod are fitted in said brackets and can be provided with openings 57 for the reception of studs 58 forming a part of said brackets 56.

Slidably mounted within the metal rod section 50 are slides 59 and 60 of like construction. Each of these slides include a U shaped body 61 having outwardly extending flanges 62 on their side walls which bear against the inner surface of the metal rod section.

The drapery or curtain sections have sewed thereto at a point slightly spaced from their upper edges loops 63 formed from tapes and the rod is slid through these tapes and the tapes support the drapes and slide on the rod. The inner-most tapes can be connected to the slides 59 and 60 by drapery pins 64. The points of the drapery pins can be inserted in said tapes or directly in the hem of the drapes and the hook portions of the pins are placed over the rods with the shanks thereof in openings 65 formed in said slides 59 and 60. Hence, upon the pulling on the ends of the pull cord the drape or curtain sections will be pulled toward or away from one another.

In this form of my invention the drapery pins and the fabric loops also rest and slide on the plastic strip. While I have stated that the inner faces of the drape or curtain sections have loops 63 sewed thereto, as this is preferred, obviously these loops can be dispensed with and the drapery pins can be inserted in the hems of the drapes with the hook parts placed over the upper edge of the rod.

The slides 59 and 60 are, of course, secured to different stretches of the pull cord 54 and clamping screws 66 can be employed for this purpose.

I lay particular stress on that form of my invention shown in Figures 11 to 15 inclusive as, obviously, when the rod is formed from metal I can obtain an exceptionally simple, compact and sturdy construction with all of the advantages of my invention.

In a metal rod construction I can make the same from telescoping sections, so that the rod can be shortened or lengthened at will.

Various types of features can be utilized for supporting my novel rod and in fact the rod can be used advantageously with my drapery cranes shown in my Patent No. 2,321,196 issued to me June 8, 1943.

From the foregoing description, it can be seen that I have provided an exceptionally simple and durable form of transverse rod for supporting drapes and that the drapes are carried in such a manner that the rods are completely hidden from view.

Changes in details may be made without departing from the spirit or the scope of my invention, but what I claim as new is:

1. In a traverse rod for supporting drapes and the like comprising a main rod section provided in one face with a pull cord receiving passage way, terminal caps carried by the ends of the rod section provided with pulleys for the pull cord, slides supported by said rod section, means for connecting the stretches of the pull cord to the slides, means for connecting the upper inner ends of the drapes to said slides the upper, outer corners of said drapes being extended around the terminal caps, and means connecting the upper, outer corners of the drapes in rear of said caps.

2. A traverse rod for supporting drapes comprising a main rod section having a longitudinally extending way for a pull cord, end caps detachably carried by the terminals of the rod section closing the ends of said way, pulleys for the pull cord carried by said end caps, slides on said rod connected with the stretches of the pull cord and means for connecting the slides to the inner upper corners of the drapes, and a detachable plastic strip fitted over the front face of said main rod section to provide a smooth bearing surface for said slides.

3. A supporting rod for drapes, curtains and the like comprising a main rod section having a longitudinally extending way in its upper face, end caps associated with the terminals of the rod section closing the ends of the way, one of said end caps being provided with a pulley and the other of said end caps being provided with a pair of pulleys, a pull cord fitted in said way having an intermediate portion thereof trained about the single pulley carried by one end cap and its stretches trained over the pulleys carried by the other end cap, drapery slides on the upper edge of the rod section, means detachably connecting one stretch of the pull cord to one slide and the other stretch of the pull cord to the other slide for holding the slides against the upper face of the rod section, and means detachably connecting a slide with the upper inner corners of each drape to be supported, a plastic strip fitted over the front face of the rod section having its upper edge extending into the way, a second plastic strip fitted on said rod section with a portion thereof extending into the way and over the top of the rod section, said slides being slidable on said plastic strips and said plastic strips forming an anti-friction bearing surface for said slides.

4. A traverse rod for supporting drapes comprising a main body section of a C shape in cross section, end caps fitted in the terminals of the rod section, one of said end caps carrying a single pulley and the other of said end caps carrying a pair of pulleys, a pull cord disposed within said main rod section having an intermediate portion trained about the single pulley carried by one end cap and its stretches trained over the pair of pulleys carried by the other end cap, slides carried by the rear face of the rod section having flanges disposed in said rod section, means detachably connecting the stretches of the pull cord to the slides, means suspending drapes from the rod and means connecting the inner upper corner of each drape to a slide, and a plastic strip of a C shape in cross section snapped over the front face of said rod section to form a smooth wear and bearing surface for the drapes and the drape suspension means.

5. In a supporting rod for drapes, curtains and the like, a slide for supporting drapes from the rod comprising a flat, rectangular shaped body having an intermediate opening for a pull-cord and end T shaped slots for receiving drapery supporting means.

6. In a traverse rod for supporting drapes, a slide for supporting drapes from the rod comprising a flat, rectangular body piece having a central opening for receiving a part of a drape pull cord and T shaped end slots for detachably receiving an intermediate part of drape supporting loops.

JOHN N. GRABER.